United States Patent
Itoh et al.

(10) Patent No.: US 7,313,458 B2
(45) Date of Patent: Dec. 25, 2007

(54) NC MACHINE TOOL

(75) Inventors: Hiroshi Itoh, Aichi pref. (JP);
Yasuharu Sumida, Aichi pref. (JP);
Kazuhiro Kikata, Aichi pref. (JP)

(73) Assignee: Yamazaki Mazak Corporation, Niwa gun, Aichi pref. (JP)

( * ) Notice: Subject to any disclaimer, the term of this patent is extended or adjusted under 35 U.S.C. 154(b) by 0 days.

(21) Appl. No.: 11/467,484

(22) Filed: Aug. 25, 2006

(65) Prior Publication Data

US 2007/0050079 A1 Mar. 1, 2007

(30) Foreign Application Priority Data

Aug. 26, 2005 (JP) ............... 2005-246281

(51) Int. Cl.
*G05B 19/401* (2006.01)

(52) U.S. Cl. ............ 700/179; 700/17; 700/86; 700/245; 318/568.1; 318/568.15

(58) Field of Classification Search ........... 700/17, 700/86, 169, 172, 179, 182, 245; 318/568.1, 318/568.15, 569, 600
See application file for complete search history.

(56) References Cited

U.S. PATENT DOCUMENTS

| | | | | |
|---|---|---|---|---|
| 4,550,375 | A * | 10/1985 | Sato et al. | ............ 700/169 |
| 4,908,746 | A | 3/1990 | Vaughn | |
| 5,604,914 | A | 2/1997 | Kabe | |
| 5,999,708 | A | 12/1999 | Kajita | |
| 6,246,920 | B1 | 6/2001 | Mizuno et al. | |
| 6,292,712 | B1 * | 9/2001 | Bullen | ............ 700/245 |
| 6,400,998 | B1 * | 6/2002 | Yamazaki et al. | ............ 700/86 |
| 6,609,038 | B1 | 8/2003 | Croswell et al. | |
| 6,671,571 | B1 * | 12/2003 | Matsumiya et al. | ........ 700/172 |
| 2002/0193972 | A1 | 12/2002 | Kudo et al. | |
| 2003/0033048 | A1 * | 2/2003 | Nakamura et al. | .......... 700/182 |
| 2006/0106616 | A1 | 5/2006 | Ohashi et al. | |
| 2007/0050079 | A1 * | 3/2007 | Itoh et al. | .................. 700/179 |

FOREIGN PATENT DOCUMENTS

| | | |
|---|---|---|
| DE | 2740873 | 3/1979 |
| EP | 0061839 | 10/1982 |
| EP | 0597127 | 5/1994 |
| JP | 05-019829 | 1/1993 |
| JP | 07-223148 | 8/1995 |
| JP | 11-33867 | 2/1999 |

OTHER PUBLICATIONS

Extended European Search Report for Application No. EP 05256639.
Official Action for U.S. Appl. No. 11/261,072, mailed May 16, 2007 (2933YM-5).

* cited by examiner

*Primary Examiner*—Kidest Bahta
*Assistant Examiner*—Douglas S Lee
(74) *Attorney, Agent, or Firm*—Sheridan Ross P.C.

(57) ABSTRACT

The NC device of the machining center has the data memory for storing exchange history and data concerning a tool therein when the tool has been manually exchanged. When the data concerning the tool is updated, the data memory also stores update history. The main control unit determines whether the tool is changed on the basis of at least either of the exchange history and the update history. On the basis of a determination result, the main control unit controls the spindle head moving unit to stop the tool as well as allows a caution about the tool to be displayed on the display unit.

15 Claims, 8 Drawing Sheets

Tool Length

Current Set Value: 166.482
Input Value: 166.431   — 120f
Variation: -0.051

Confirm input value

NC MACHINE TOOL

BACKGROUND OF THE INVENTION

The present invention relates to an NC machine tool, in particular, an NC machine tool capable of preventing a tool exchange error by the operator.

Conventionally, there have been NC machine tools having a function of automatically exchanging tools. For example, Japanese Laid-Open Patent Publication No. 11-33867 discloses a technique of detecting change of a machining program, tool exchange, change of data correction amount by sensors, in preparation for the case where the tool interferes with a machine, and decreasing rapid transverse speed of the tool to perform automatic operation of a machine tool. However, the technique serves to reduce damage caused by interference of the tool with the machine, not to prevent occurrence of a tool exchange error. For this reason, even when damage due to interference of the tool with the machine is suppressed, both of the tool and the machine can be damaged or operation of the machine tool can be stopped, resulting in a decrease in productivity.

Japanese Laid-Open Patent Publication No. 07-223148 proposes a technique of preventing an accident caused by a tool exchange error. According to the technique, at automatic operation of the NC machine tool, it is determined whether a correct tool is actually attached by detecting the shape of the attached tool by use of an optical sensor. However the technique has the disadvantage that it takes cost to construct a structure for recognizing the shape of the tool and determining the tool exchange error.

SUMMARY OF THE INVENTION

An objective of the present invention is to provide an NC machine tool capable of preventing a tool exchange error by drawing an attention of the operator on the basis of internal data of a machine tool.

To achieve the foregoing objective and in accordance with one aspect of the present invention, an NC machine tool that moves a head, to which a tool is attached, and a work relative to each other, thereby machining the work with the tool, is provided. The NC machine tool includes a first storage device, a second storage device, a third storage device, a determination device, a controller, and an alarm device. The first storage device stores, when the tool has been manually exchanged, history of the exchange. The second storage device stores data on the tool. The third storage device stores, when the data is updated, history of the update. The determination device determines whether there has been a change related to the tool on the basis of the exchange history and the update history. The controller stops movement of the tool on the basis of a determination result of the determination device. The alarm device issues an alarm about the tool on the basis of the determination result of the determination device.

DETAILED DESCRIPTION OF THE PREFERRED EMBODIMENTS

With reference to FIGS. 1 to 10, an embodiment of an NC machine tool of the present invention embodied by a vertical machining center will be described below.

Figure 1:
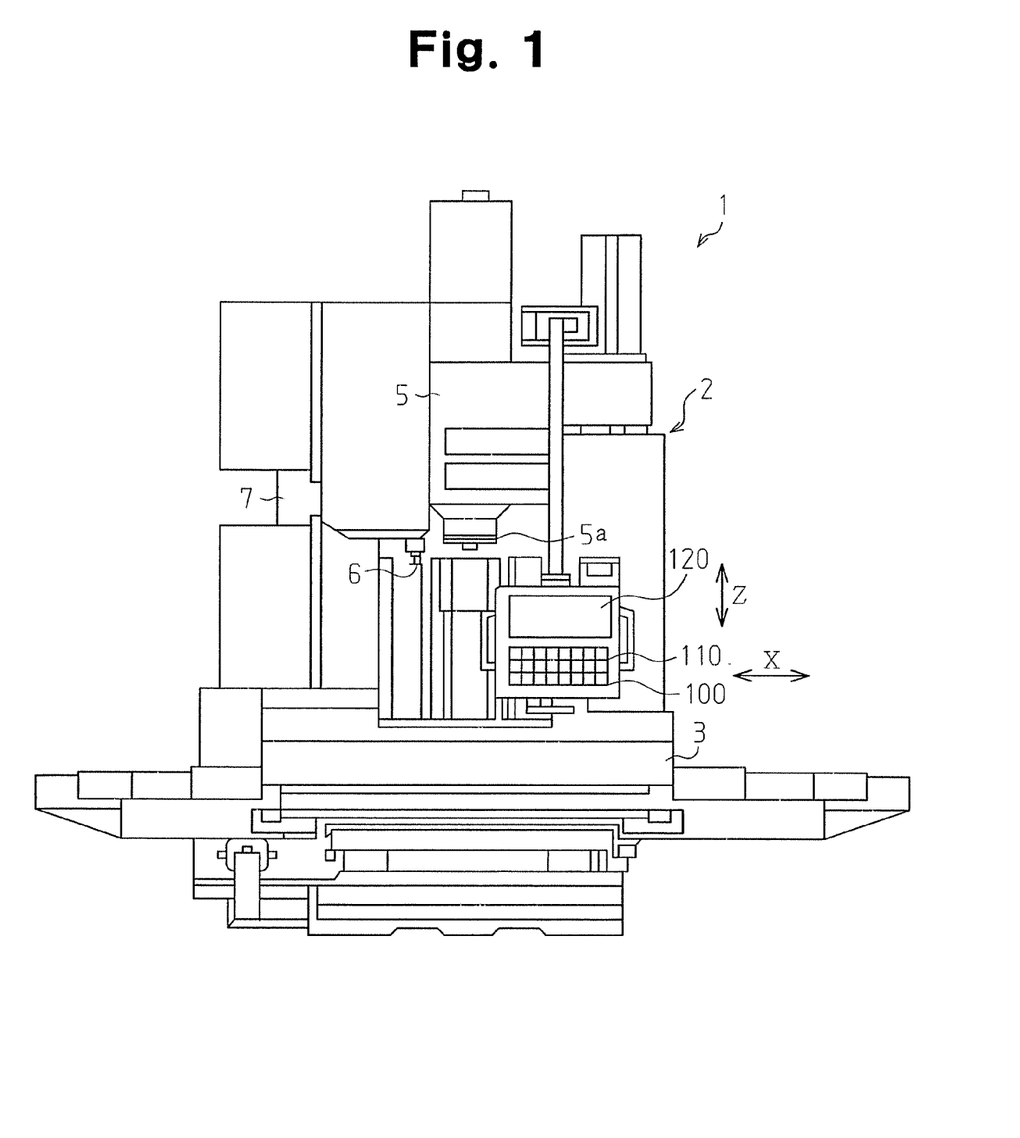
FIG. 1 is a diagrammatic front view of a machining center in accordance with an embodiment.
Figure 2A:
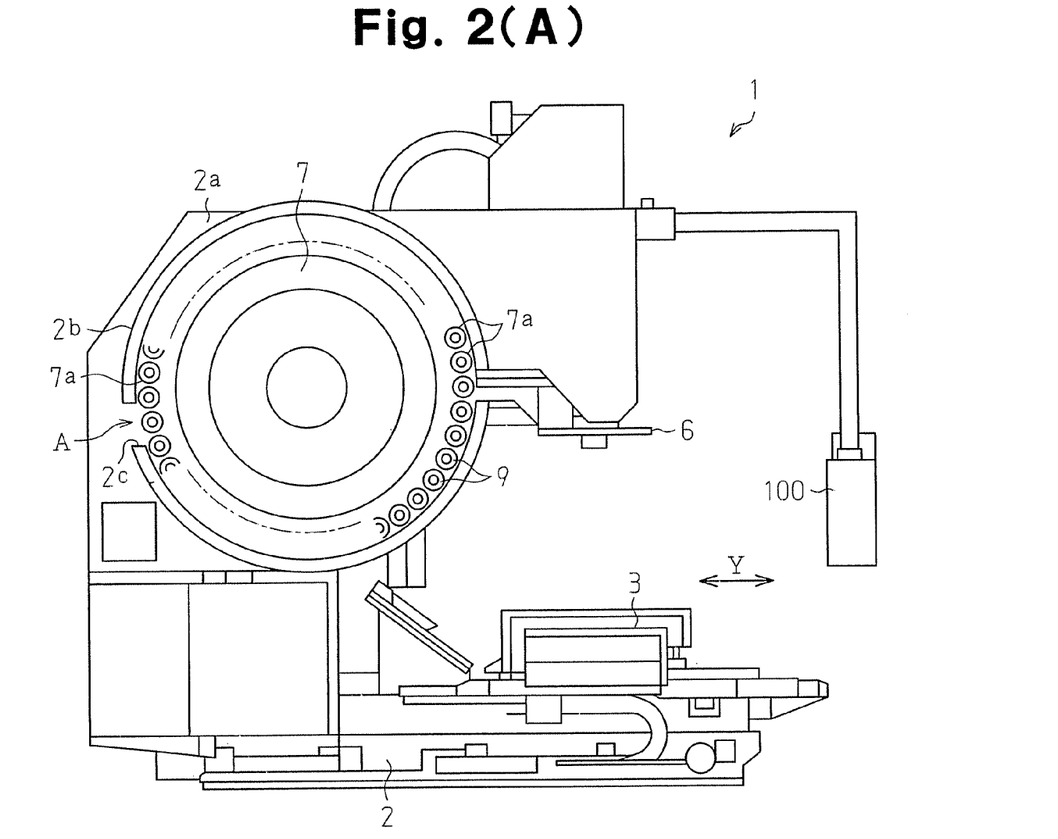
FIG. 2(A) is a diagrammatic side view of the machining center.
Figure 2B:
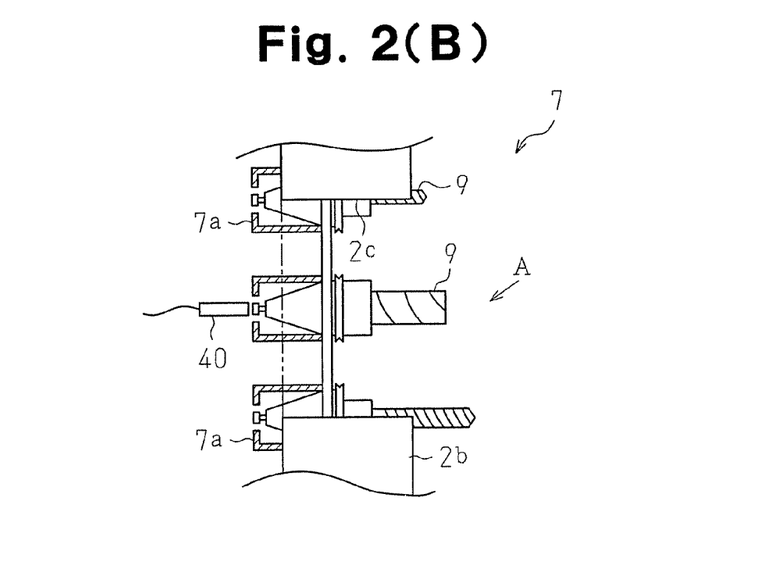
FIG. 2(B) is a partial explanation view of an enlarged vicinity of a tool picking portion.
Figure 3:
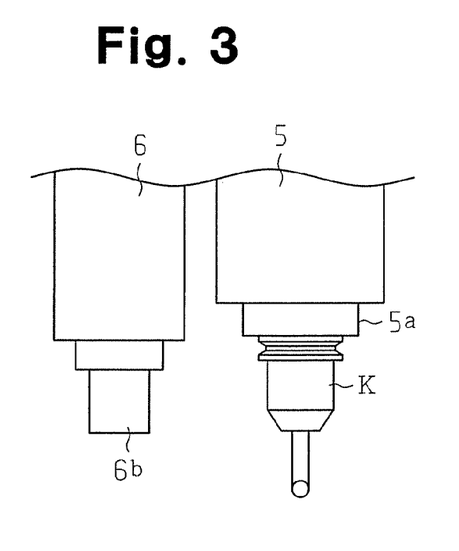
FIG. 3 is an enlarged partial side view of a tool exchange device.
Figure 4:
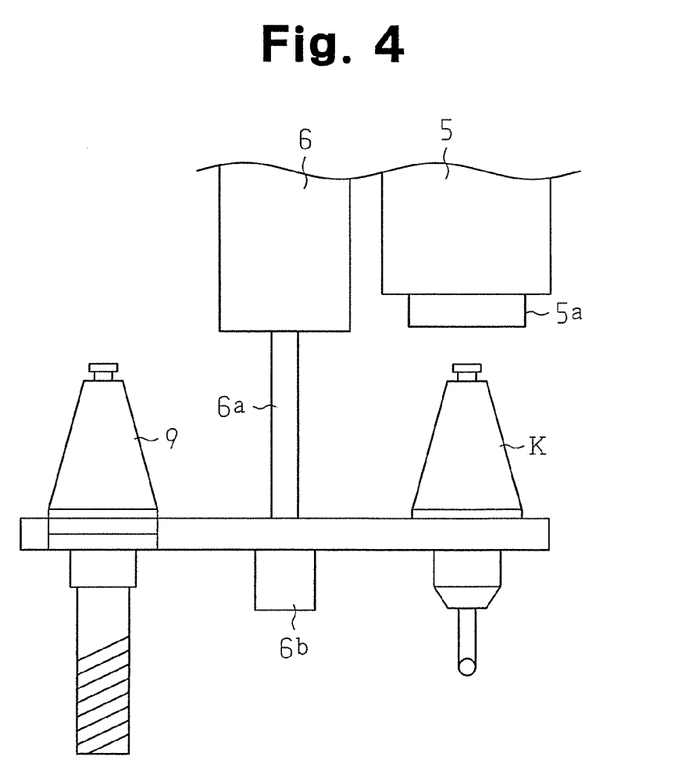
FIG. 4 is an enlarged partial side view of the tool exchange device.

As shown in FIGS. 1, 2(A), and 2(B), a machining center 1 has a main unit 2. A table 3 is supported by the main unit 2 so as to be movable in a horizontal direction (X-axis direction, Y-axis direction). A column 2a of the main unit 2 is provided with a spindle head 5. The spindle head 5 is disposed above the table 3. The spindle head 5 is supported so as to be movable in a vertical direction (Z-axis direction) with respect to the table 3.

The table 3 and the spindle head 5 are held in the machining center 1 so as to be relatively movable along three axes (X, Y, Z), all perpendicular to one another. In the machining center 1, the amount of movement of the table 3 and the spindle head 5 is controlled by an NC device 100 and a work set on the table 3 is machined by use of a tool K attached to the spindle head 5.

The tool K can be attached/detached to/from a spindle 5a of the spindle head 5. A tool exchanger 6 is formed on a side of the spindle head 5. As shown in FIG. 2(A), a disc-like tool magazine 7 is rotatably supported by the main unit 2. On a periphery of the tool magazine 7 are arranged a plurality of pockets 7a for accommodating tools 9. The tools 9 can be attached/detached to/from the pockets 7a. A cylindrical cover 2b which covers a circumference of the tool magazine 7 is formed on the main unit 2. A tool picking port 2c is formed on the cover 2b. The tool picking port 2c corresponds to a tool picking position A.

As shown in FIG. 2(B), as the tool magazine 7 is rotated, each tool pocket 7a is disposed at the tool picking position A. The operator can manually exchange the tool in the tool pocket 7a disposed at the tool picking position A. A sensor 40 as a detector for detecting the presence or absence of the tool 9 in each tool pocket 7a is provided at the tool picking position A in the tool magazine 7. The sensor 40 is connected to a main control unit 130 of the NC device 100 (refer to FIG. 5) and a signal output from the sensor 40 is read by the main control unit 130. When the output signal from the sensor 40 is changed from OFF to ON, the main control unit 130 determines that the tool has been manually exchanged. A unique pocket number "TNo." is given to each tool pocket 7a in the tool magazine 7.

The spare tools 9 are located in the tool magazine 7. The tool exchanger 6 has a rotational arm 6a which protrudes downward and a holder 6b is rotatably supported by a lower end of the rotational arm 6a. As the rotational arm 6a rotates, the tool K attached to the spindle 5a is replaced by the tool 9 held by the holder 6b. As the tool magazine 7 rotates, the tools 9 in the tool pockets 7a, such as an end mill and a drill, are consecutively disposed at the tool picking position A.

Next, with reference to FIG. 5, the NC device 100 in the machining center 1 will be described.

Figure 5:
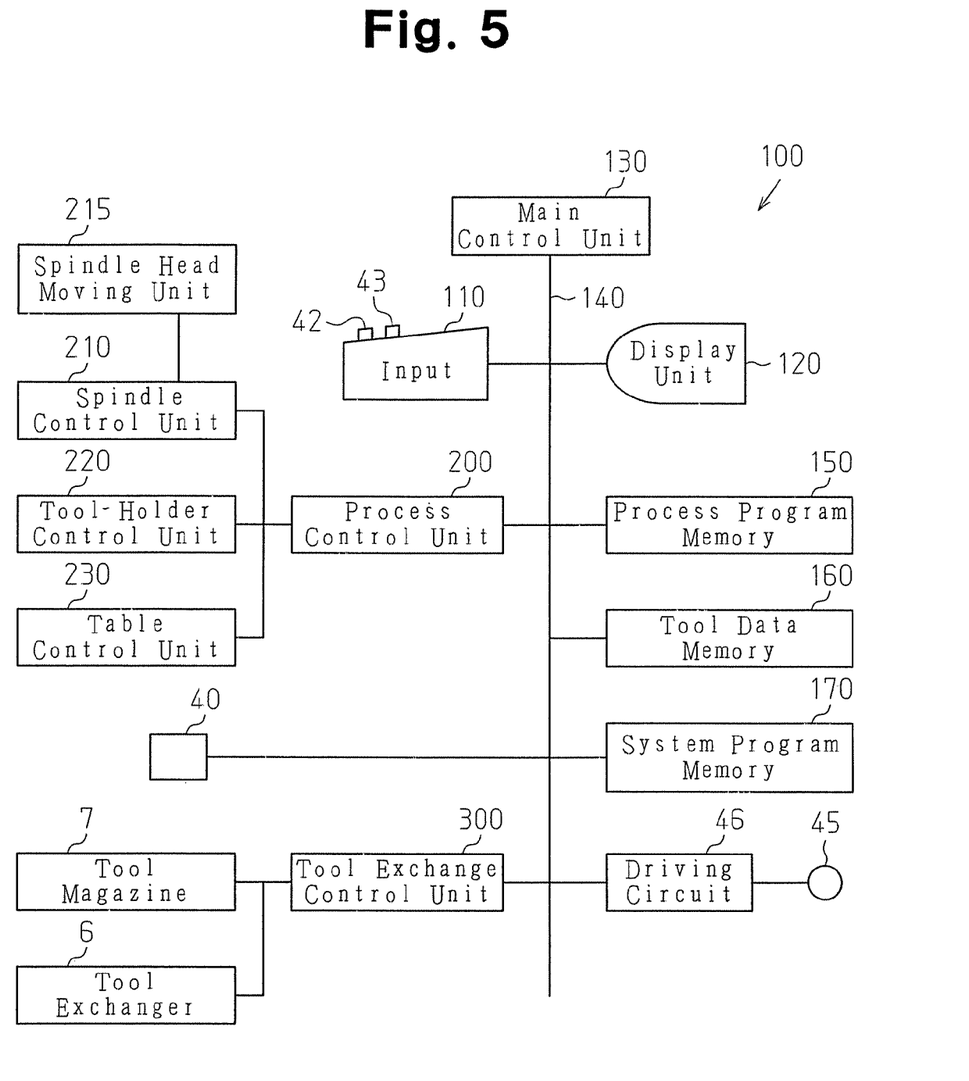
FIG. 5 is a block diagram showing electric circuit of an NC device of the machining center.

As shown in FIG. 5, the NC device 100 has an input unit 110 including a keyboard, a display unit 120 including a display device such as liquid crystal display and an alarm device, the main control unit 130 as a controller, various memories 150 to 170, a machining control unit 200 and a tool exchange control unit 300. The main control unit 130 is connected to the input unit 110, the display unit 120, the various memories 150 to 170, the machining control unit 200 and the tool exchange control unit 300 via a bus 140.

A machining program memory 150 stores a machining program for machining a work. A data memory 160 as a second storage device stores data on the tool used in the machining center 1 (hereinafter referred to as tool data) therein. The tool data includes TNo., tool name, diameter, suffix, tool diameter, tool length, cutting edge correction, life time, operating time, group No., diameter correction amount and length correction amount.

The "suffix" represents a code for identifying between tools having the same diameter. The "cutting edge correction" represents correction amount of an end position of the tool on the basis of consumption amount through machining. The "life time" represents life time of the tool. The "operating time" represents operating time of the tool. The "group No." represents a number of a tool group (in a group of tools having the same shape and size, when the one tool has been used for a period exceeding the life time, the group number is given to the spare tool). The "ID No." represents an ID number of the tool. The "diameter correction amount" represents correction amount of tool diameter. The "length correction amount" represents correction amount of tool length.

When a tool is set in the tool pocket 7a, the tool data is input from the input unit 110 by means of a keyboard and stored in a predetermined area of the data memory 160. At this time, the tool data is associated with the tool pocket 7a and stored in the data memory 160. The "diameter correction amount", the "length correction amount", the "tool diameter", the "tool length" and the "cutting edge correction" are tool data used for executing the machining program as data to be checked.

A system program memory 170 stores various programs for controlling the main control unit 130, the machining control unit 200 and the tool exchange control unit 300. The machining control unit 200 is connected to a spindle control unit 210, a tool holder control unit 220 and a table control unit 230 via the bus 140. The spindle control unit 210 is connected to a spindle head moving unit 215. The spindle head moving unit 215 controls movement of the spindle head 5 in the Z direction. The spindle control unit 210 controls driving of a motor (not shown) for rotating the spindle 5a of the spindle head 5. The table control unit 230 controls movement of the table 3 in the X direction and the Y direction. The tool exchange control unit 300 is connected to the tool magazine 7 and the tool exchanger 6. The main control unit 130 is connected to a driving circuit 46 via the bus 140. The main control unit 130 controls lighting of an alarm lamp 45 as an alarm device through the driving circuit 46.

The input unit 110 is provided with an unclamp switch 42 as a detector and a cycle start button 43 as a selector. When the unclamp switch 42 is turned on, according to a control command from the machining control unit 200, the tool holder control unit 220 opens a tool holder not shown in the spindle head 5. Thus, the tool can be manually removed from the tool holder. When the unclamp switch 42 is turned off, according to a control command from the machining control unit 200, the tool holder control unit 220 closes the tool holder in the spindle head 5. Thus, the tool is held by the tool holder. Based on an output signal from the unclamp switch 42, the main control unit 130 associates tool data of the tool attached to the tool holder with a tool exchange flag and sets the flag in the data memory 160.

When the output signal from the sensor 40 is switched from OFF to ON, the main control unit 130 associates tool data of the tool in the tool pocket 7a having "TNo." with a tool exchange flag and sets the flag in the data memory 160. In this embodiment, the data memory 160 serves as a first storage device in which exchange history is stored when the tool is manually exchanged and as a third storage device in which update history is stored when the tool data is updated.

Next, operations of the above-mentioned machining center 1 will be described.

Figure 6:
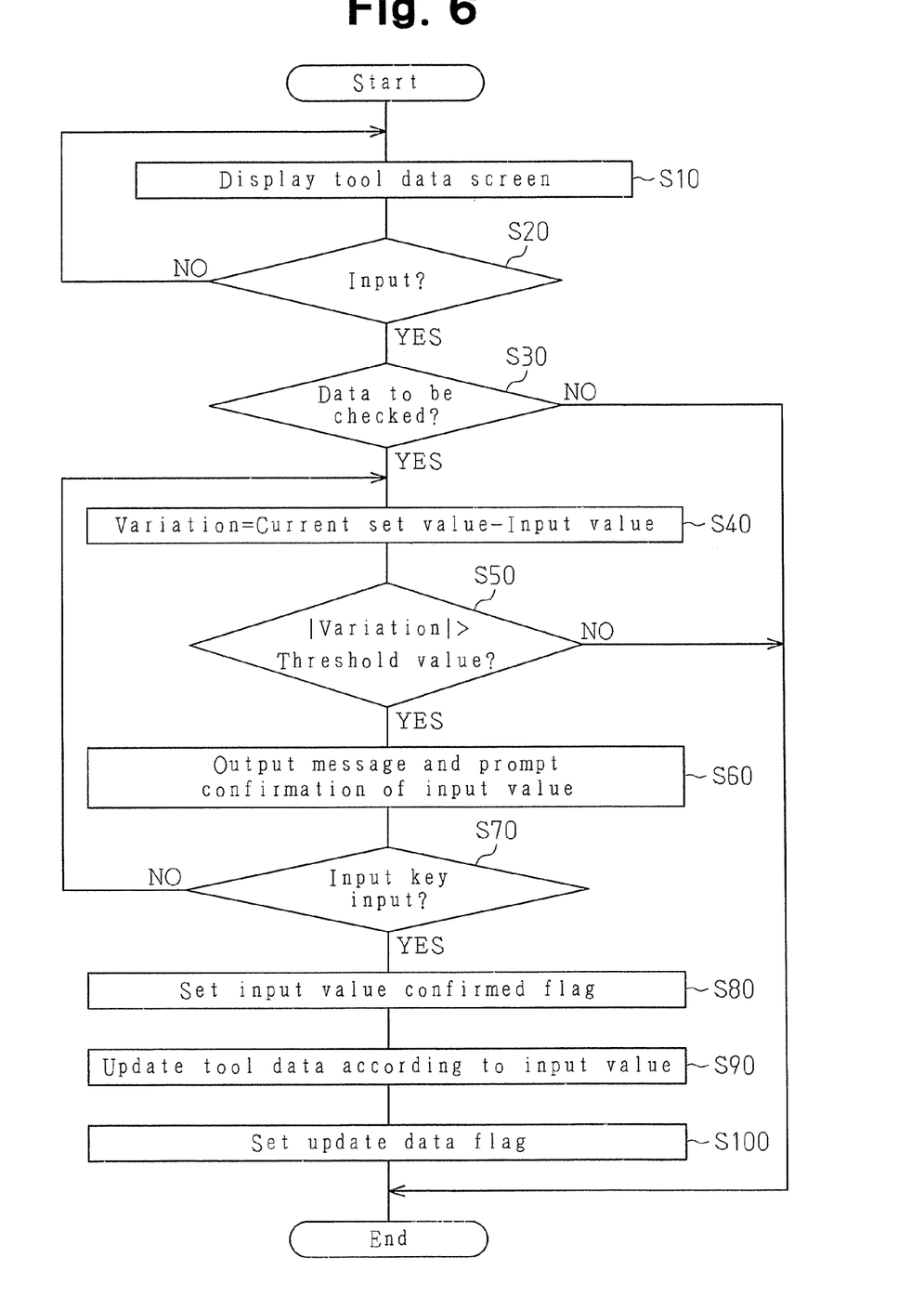
FIG. 6 is a flowchart performed by a main control unit.
Figure 7:
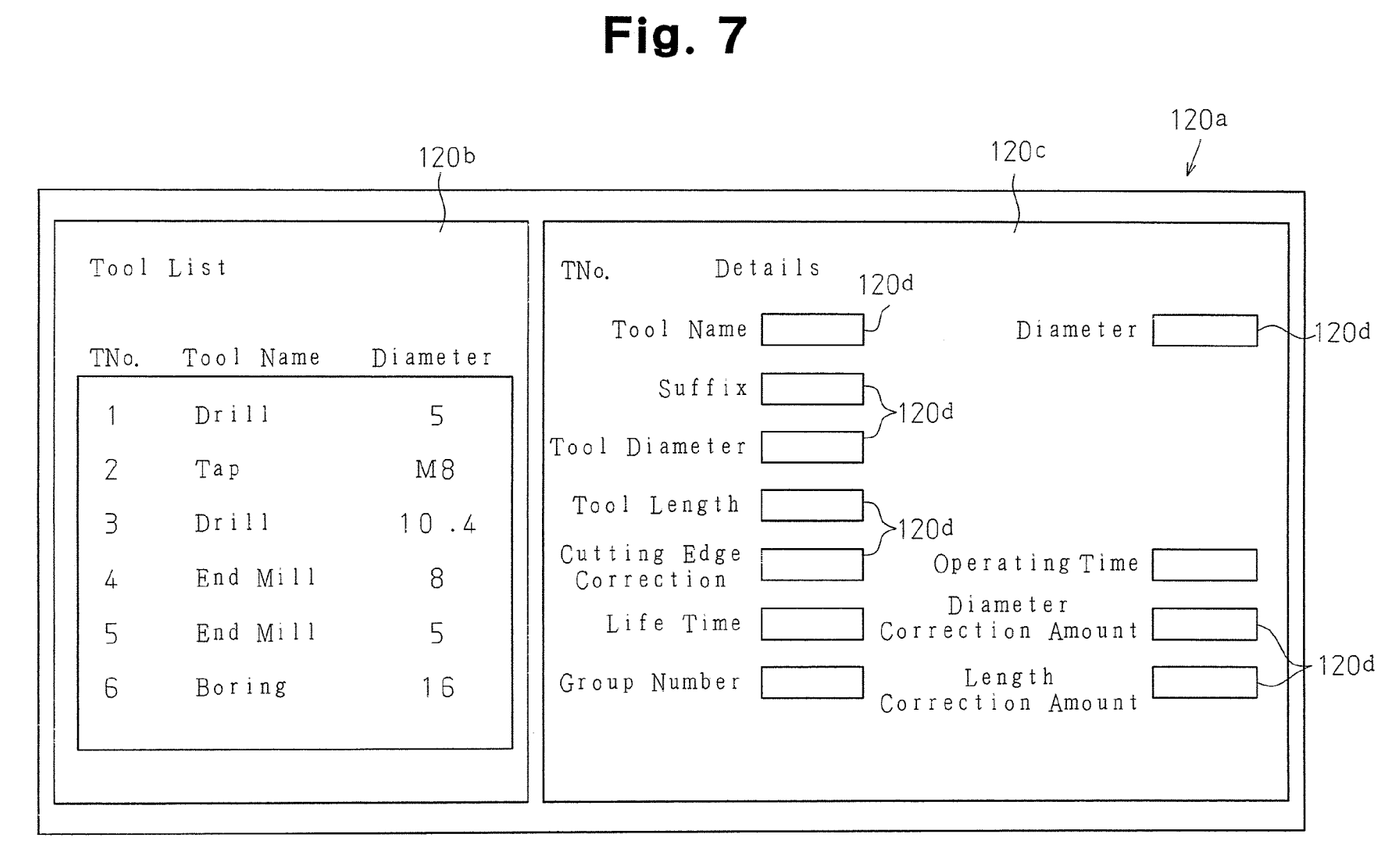
FIG. 7 is an explanation view of a display screen of a display unit.

FIG. 6 is a flowchart performed by the main control unit 130 when the tool data is changed. When a display command for tool data is input from the input unit 110, the main control unit 130 allows a tool data screen to be displayed on the display unit 120 (refer to FIG. 1) (S10). FIG. 7 shows a screen 120a of the display unit 120 on which the tool data is displayed. Data corresponding to items of "TNo.", "tool name" and "diameter" is displayed on a display area 120b for showing a tool list. Data such as "tool name", "diameter", "suffix" of the tool selected by use of a pointer not shown or the like is displayed on a display area 120c. The display area 120c is provided with display and input sections 120d corresponding to the respective items. The data stored in the data memory 160 is displayed in the display and input sections 120d. New data can be input to the display and input sections 120d.

When new data is input from the input unit 110 (YES at S20), the main control unit 130 determines whether the input data is data to be checked (S30). When data for determining whether the data is data to be checked is not input, the main control unit 130 keeps the tool data screen to be displayed on the display unit 120 (S10).

When the input data is not data to be checked (NO at S30), the main control unit 130 temporarily finishes this flow. When the input data is data to be checked (YES at S30), the main control unit 130 as a calculator calculates, as a variation, a difference between the data input as a correction value (hereinafter referred to as an input value) and the value stored in the data memory 160 prior to input of the input value (hereinafter referred to as a set value) at S40.

The main control unit 130 as a comparator determines whether the input value is proper by comparing an absolute value of the variation with a threshold value (S50). In this case, the threshold value is previously set according to the type of the data to be checked. When the absolute value of the variation is the threshold value or smaller, the main control unit 130 determines that the input value is proper and finishes this processing temporarily (NO at S50). When the absolute value of the variation exceeds the threshold value, the main control unit 130 pops up the confirmation display area 120e on the screen 120a to make the operator confirm the input value (refer to FIG. 8).

Figure 8:
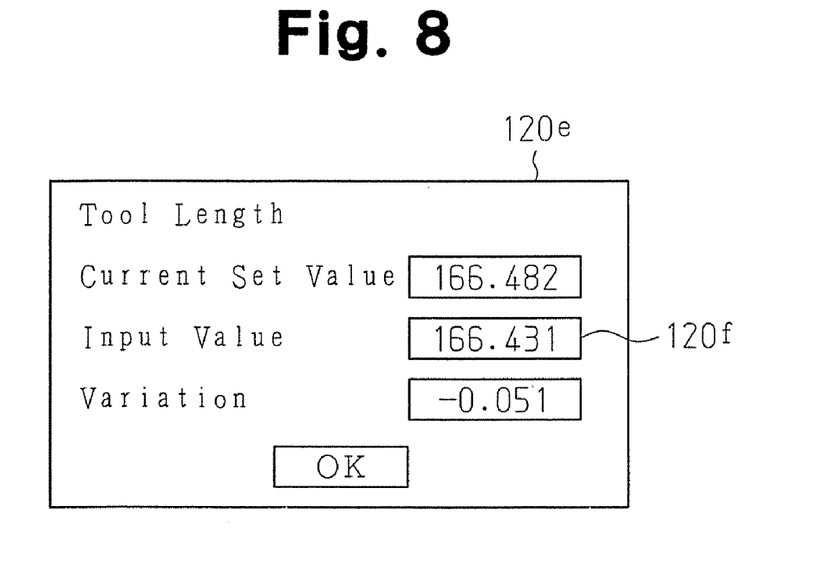
FIG. 8 is an explanation view of a display screen of the display unit.
Figure 9:
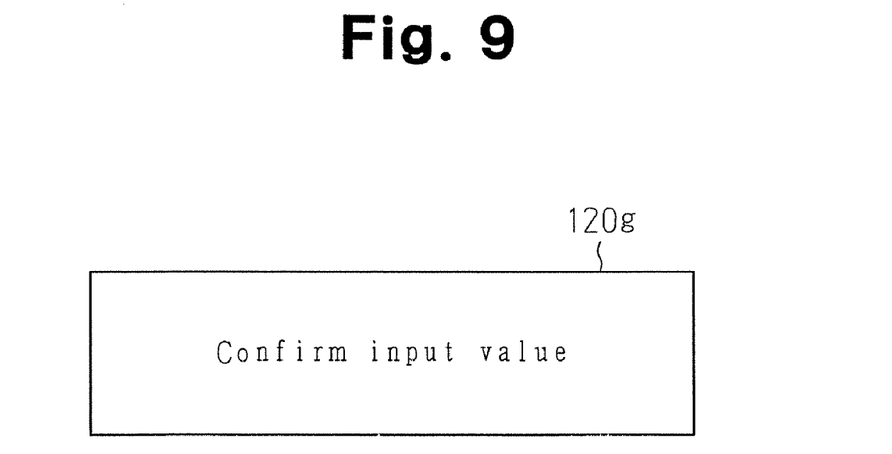
FIG. 9 is an explanation view of a display screen of the display unit.

FIG. 8 shows an example in which the confirmation display 120e concerning the "tool length" is displayed on the display unit 120. The "current set value", "input value" and "variation" concerning the tool length are displayed as the confirmation display 120e and "OK" is displayed as a confirmation button. The input value is displayed in the display section 120f of the "input value" and new data can be input. As shown in FIG. 9, the main control unit 130 allows a message 120g "Please confirm input data" to be displayed on the screen 120a of the display unit 120. Since a data input error can occur when the absolute value of the variation exceeds the threshold value, the main control unit 130 causes display of such message 120g, thereby prompting the operator to confirm the input value.

Next, when the "OK" button is clicked by means of a mouse (YES at S70), the main control unit 130 determines that the input value has been confirmed and sets an input value confirmed flag (S80). When new data is input to the display section 120f (NO at S70), the main control unit 130 executes a series of processing at S40 and subsequent steps with respect to the input data.

After the setting of the input value confirmed flag, the main control unit 130 stores the input value in the data memory 160 (S90). In other words, the main control unit 130 rewrites the tool data stored in the data memory 160 to the newly input data. At the time of updating data, the input value confirmed flag is associated with the updated tool data and the associated flag is stored in the data memory 160. The main control unit 130 sets an update data flag on the tool, the data to be checked of which is updated, (S100) and terminates this processing.

Figure 10:
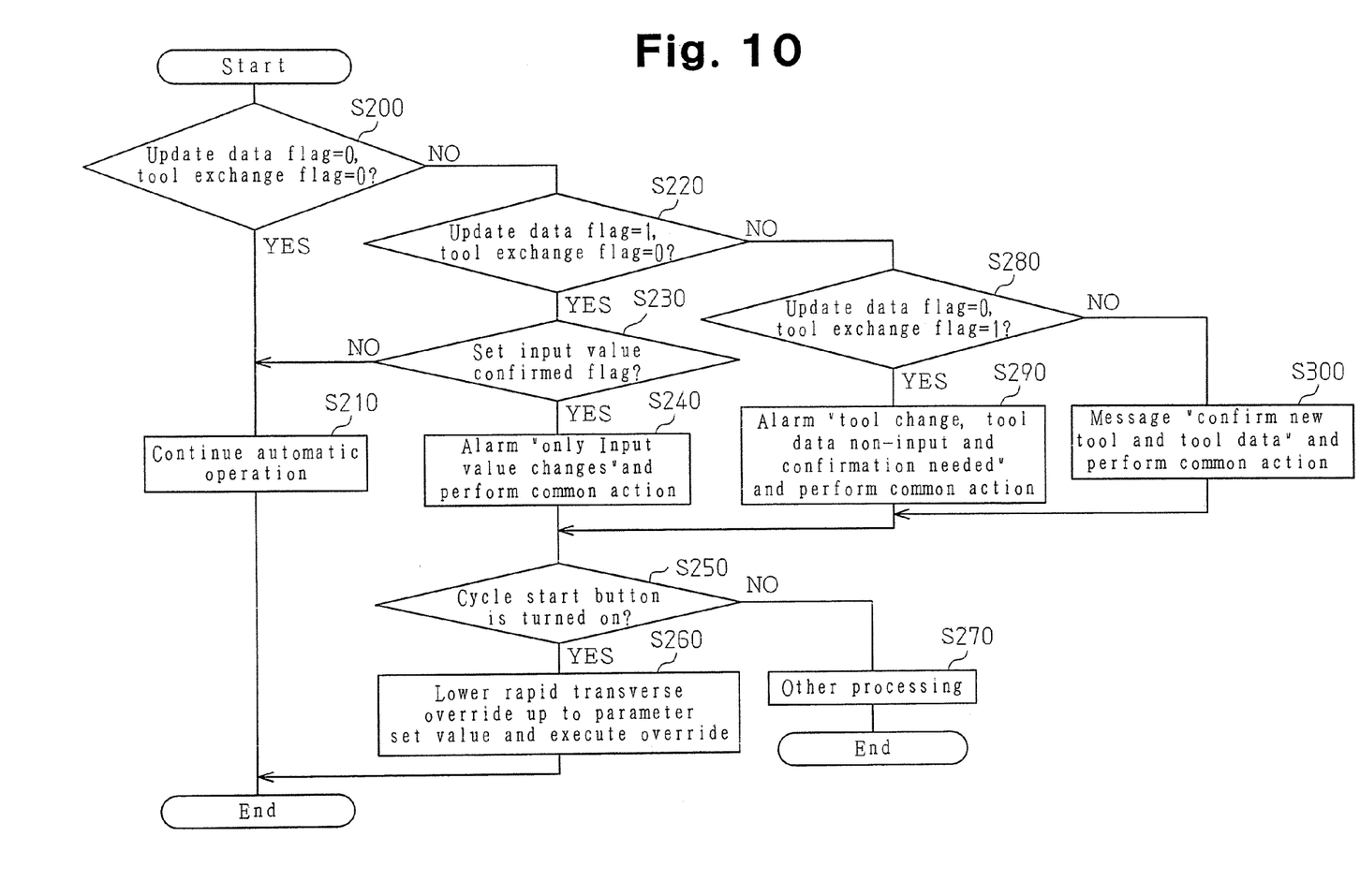
FIG. 10 is a flowchart performed by the main control unit.

Next, with reference to FIG. 5 and FIG. 10, change check routine performed in automatic operation will be described.

The main control unit 130 reads the machining program from the machining program memory 150. When machining of the work is started, the main control unit 130 reads data on the tool K attached to the spindle head 5 from the data memory 160. For the tool K attached to the spindle head 5 (refer to FIG. 3), the main control unit 130 as a determining device determines the update data flag and the tool exchange flag are set or reset from the data memory 160 (S200, S220, S280). On the basis of the machining program and the tool data, the main control unit 130 determines which tool pocket 7a has accommodated the tool K attached to the spindle head 5.

When both of the update data flag and the tool exchange flag are reset (YES at S200), the main control unit 130 performs automatic operation (S210). When the outcome of S200 is NO, the main control unit 130 determines whether the update data flag is set and the tool exchange flag is reset (S220).

When the outcome of S220 is YES, the main control unit 130 determines whether the input value confirmed flag is set to the tool data read in performing this routine (S230). When the input value confirmed flag is set (YES at S230), the main control unit 130 determines that the operator has confirmed that the absolute value of the variation between the set value and the input value exceeds the threshold value, and the operation proceeds to S240. On the other hand, when the input value confirmed flag is not set to tool data (NO at S230), since the variation of the input value is the threshold value or smaller as apparent from the flowchart of FIG. 6, the main control unit 130 determines that interference of the tool with the machine will not be generated. That is, the main control unit 130 as an invalidating device invalidates determination of "YES" at S220, and the operation proceeds to S210.

At S240, the main control unit 130 displays that "only input value of tool data is changed" on the display unit 120 and performs feed hold to pause feeding of the tool K by the spindle head 5. To prompt the operator to confirm the input value of the tool data, the main control unit 130 turns on the alarm lamp 45. Here, the feed hold and the processing of turning on the alarm lamp 45 will be described as a common action below.

When the outcome of S220 is NO, the main control unit 130 determines whether the update data flag is reset and the tool exchange flag is set (S280). When the outcome of S280 is YES, to prompt the operator to confirm the input value of the tool K and the tool data, the main control unit 130 displays "tool change, tool data non-input, confirmation needed" on the display unit 120 and performs the above-mentioned common action (S290).

When the outcome of S280 is NO, the main control unit 130 determines that the update data flag and the tool exchange flag are set, and the operation proceeds to S300. To prompt the operator to confirm the input value of the tool K and the tool data, the main control unit 130 displays "new tool, confirm input value of tool data" on the display unit 120 and performs the above-mentioned common action (S300). The main control unit 130 prompts the operator to confirm the tool K and the input value of the tool data, and then the operation proceeds to S250.

At S250, the main control unit 130 determines whether the cycle start button 43 of the input unit 110 is turned on by the operator. When the cycle start button 43 is turned on (YES at S250), the main control unit 130 moves to S260. The main control unit 130 decreases rapid traverse override of the tool K up to a predetermined value (%) and terminates this routine (S260). The rapid traverse override at this time is set to be a slower speed than the ordinary rapid traverse override. When next cutting feeding is commanded while executing a machining program, the main control unit 130 returns the changed rapid traverse override to an ordinary value. When the cycle start button 43 is not turned on (NO at S250), the control unit 130 executes the other processing on the basis of the operation by the other input unit 110 (S270) and terminates this routine.

As described above, this embodiment obtains the following advantages.

In this embodiment, when the tool K is manually exchanged, movement of the tool is stopped by performing feed hold during automatic machining. Thus, it is possible to prompt the operator to confirm tool exchange, thereby preventing tool exchange error from occurring. When the tool data is updated, a caution concerning the tool is displayed on the display unit 120. Accordingly, it is possible to prompt the operator to confirm tool data update, thereby preventing a tool data update error from occurring.

In this embodiment, when the sensor 40 detects presence or absence of a tool in the pocket 7a and when the unclamp switch 42 detects that a tool has been removed from the spindle head 5, the tool exchange flag is stored in the data memory 160. Thus, it is possible to prompt the operator to confirm tool exchange on the basis of the data stored in the data memory 160. Furthermore, display of tool exchange and tool data update on the display unit 120 enables the operator to confirm them.

In this embodiment, when the tool exchange flag is set and the update data flag is not set, the fact that the tool data is not updated is displayed on the display unit 120. Thus, it is possible to prompt the operator to confirm that the exchanging tool is properly accommodated in the tool pocket or there is no omission of input of the tool data and to take an appropriate step. By only displaying whether the input value of the tool data is correct or not, it is possible to draw the operator's attention, thereby preventing an input error by the operator. Furthermore, by displaying the tool data and the input value as well as the difference between them on the display unit 120, it is possible to prompt the operator to confirm the input value.

In this embodiment, when the absolute value of the variation is larger than the threshold value, by displaying the variation on the display unit 120, it is possible to prompt the operator to confirm the input value. Furthermore, since feeding of the tool K is set to be slower than an ordinary value when performing rapid traverse override, shock due to interference of the tool K with the machine can be minimized.

In this embodiment, when the variation of the input value is the threshold value or smaller, the main control unit 130 invalidates determination on the update data flag and the tool exchange flag. For example, in order to improve machining accuracy after cutting of the work, the tool data may be rewritten by the operator at the next cutting. In this case, the main control unit 130 determines that the difference between the tool data and the correction value is smaller than the threshold value and is proper, and invalidates determination on the update data flag and the tool exchange flag. In this manner, cutting of the next work can be performed without stopping movement of the tool.

This embodiment may be modified as follows.

In this embodiment, although all of the input value, the current set value and the variation are displayed on the display unit 120 as shown in FIG. 8, only the input value, or the input value and the variation may be displayed.

Although the present invention is embodied in the vertical machining center, the present invention may be embodied in the other NC machine tool such as a horizontal machining center and a composite processing machine.

The invention claimed is:

1. An NC machine tool that moves a head, to which a tool is attached, and a work relative to each other, thereby machining the work with the tool, the NC machine tool comprising:
    a first storage device for storing, when the tool has been manually exchanged, history of the exchange;
    a second storage device for storing data on the tool;
    a third storage device for storing, when the data is updated, history of the update;
    a determination device for determining whether there has been a change related to the tool on the basis of the exchange history and the update history;
    a controller for stopping movement of the tool on the basis of a determination result of the determination device; and
    an alarm device for issuing an alarm about the tool on the basis of the determination result of the determination device.

2. The NC machine tool according to claim 1 further comprising a detector for detecting that the tool has been manually exchanged,
    wherein the exchange history is stored in the first storage device on the basis of an output signal from the detector.

3. The NC machine tool according to claim 2 further comprising a plurality of pockets provided in a main unit, the pockets accommodating a spare tool that is not attached to the head,
    wherein the detector is a sensor for detecting presence or absence of the tool in each pocket.

4. The NC machine tool according to claim 2,
    wherein the detector is an unclamp switch that outputs, to the controller, a signal for making the tool attached to the head detachable.

5. The NC machine tool according to claim 1,
    wherein the alarm device is a display device, and
    wherein, when movement of the tool is stopped, the controller allows a message on the tool to be displayed on the display device on the basis of the exchange history and the update history.

6. The NC machine tool according to claim 1,
    wherein the alarm device is an alarm lamp, and
    wherein, when movement of the tool is stopped, the controller turns on the alarm lamp on the basis of the exchange history and the update history.

7. The NC machine tool according to claim 6, further comprising a selector for selecting whether or not rapid transverse override is performed after movement of the tool is stopped.

8. The NC machine tool according to claim 5,
    wherein, when there is the exchange history and there is not the update history on the tool attached to the head, the fact that the data has not been updated is displayed on the display device.

9. The NC machine tool according to claim 5 further comprising an input unit for inputting correction value of the data,
    wherein, when the correction value is input from the input unit, the controller allows both of the data stored in the second storage device and input correction value to be displayed on the display device.

10. The NC machine tool according to claim 9, further comprising a calculator for calculating a difference between the data and the correction value,
    wherein the calculator allows the difference between the data and the correction value to be displayed on the display device.

11. The NC machine tool according to claim 10, further comprising a comparator for comparing the difference between the data and the correction value with a threshold value,
    wherein the comparator determines whether the difference is proper and allows the difference to be displayed on the display device on the basis of the determination result.

12. The NC machine tool according to claim 11,
    wherein, when the difference is larger than the threshold value, the controller allows confirmation display concerning the tool to be popped up and displayed on the display device.

13. The NC machine tool according to claim 12,
    wherein the controller allows a message to prompt confirmation of the correction value to be displayed on the display device.

14. The NC machine tool according to claim 9,
    wherein the input unit outputs a confirmation signal according to an external operation, and
    wherein the controller updates the data to the correction value on the basis of the confirmation signal from the input unit.

15. The NC machine tool according to claim 11, further comprising an invalidating device for invalidating the determination result of the determination device when the difference is proper.

* * * * *